(12) United States Patent
Yi et al.

(10) Patent No.: US 6,468,702 B1
(45) Date of Patent: Oct. 22, 2002

(54) COLOR FILTER AND METHOD OF MANUFACTURING THE SAME

(75) Inventors: Jonghoon Yi, Seoul; Jaekyun Lee; Jeonghyun Kim, both of Kyonggi-do; Yongin Park, Seoul, all of (KR)

(73) Assignee: LG. Philips LCD Co., Ltd., Seoul (KR)

( * ) Notice: Subject to any disclaimer, the term of this patent is extended or adjusted under 35 U.S.C. 154(b) by 50 days.

(21) Appl. No.: 09/593,661

(22) Filed: Jun. 14, 2000

(30) Foreign Application Priority Data

Jun. 14, 1999 (KR) ............................................. 99-22103

(51) Int. Cl.[7] ........................... G02B 5/20; G02F 1/1335
(52) U.S. Cl. ........................................... 430/7; 347/106
(58) Field of Search ............................ 430/7; 349/106; 347/106

(56) References Cited

FOREIGN PATENT DOCUMENTS

| JP | 8-166507 A | * | 6/1996 |
| JP | 10-197715 A | * | 7/1998 |

* cited by examiner

*Primary Examiner*—John A. McPherson
(74) *Attorney, Agent, or Firm*—Birch, Stewart, Kolasch & Birch, LLP

(57) ABSTRACT

The present invention discloses a color filter for a liquid crystal display device, which includes: a black matrix formed on a substrate; a photosensitive water-repellent layer, such as benzocyclobutene, correspondingly formed on the black matrix; a color filter layer formed on the substrate in openings within the benzocyclobutene layer; and a transparent conductive electrode formed on the black matrix and the color filter layers.

9 Claims, 3 Drawing Sheets

COLOR FILTER AND METHOD OF MANUFACTURING THE SAME

CROSS REFERENCE

This application claims the benefit of Korean Patent Application No. 1999-22103 filed on Jun. 14, 1999, under 35 U.S.C. § 119, the entirety of which is hereby incorporated by reference.

BACKGROUND OF THE INVENTION

1. Field of the invention

The invention relates to a color filter for use in a liquid crystal display panel and a method of making the same.

2. Description of Related Art

Methods of making a color filter for a liquid crystal display panel or the like include a dyeing technique, a pigment dispersion technique, a printing technique and an electrodeposition technique.

In the dyeing technique, a photosensitive material is added to the water-soluble polymer material that is a dye material, sensitizing it to light. After this has been patterned through a lithographic process, it is steeped in a dye solution to obtain a colored pattern.

For example, first a black matrix that is an opaque portion is formed on a glass substrate. Then, the dye material, which is made by adding a photosensitive material to a. water-soluble polymer material so that the solubility in a solvent is reduced when exposed to light, is coated on the black matrix. Part of the dye material is exposed to light through a mask and developed, thus carrying out patterning so that the dye material remains only on the area of the first color. Sequentially, the dye material is steeped in dye solution to be dyed and then set to form the first color layer. This process is repeated three times to form a three-color filter.

Whereas a color filter made by the dyeing technique has a high transmissivity and bright colors, it is characterized by inferiority with respect to a light-resistance, a heat-resistance and a hygroscopicity.

In the pigment dispersion technique, a photosensitive resin in which a pigment has been dispersed is coated on a substrate, and this is patterned to obtain a single-color pattern; this process is then repeated. In the above dyeing technique, the dyeing process is carried out after patterning the dye material, whereas with the pigment dispersion technique a photosensitive resin that has already been colored is coated on the substrate. A color filter made by the pigment dispersion technique has a high durability but a somewhat reduced transmissivity.

Furthermore regarding the use of photosensitive resin, at least more than 70% of the amount of the photosensitive applied resin must be removed and disposed of, leading to a big problem in material efficiency. In the printing technique, paint made by dispersing pigment in thermosetting resin is applied by repeated printing to form three colors, respectively, and the resin is heat-cured to form the color layer. While the printing technique is simple, it is inferior in flatness.

In the electrodeposition technique, a patterned transparent electrode is provided on a substrate, and then this is immersed in an electrodeposition fluid containing a pigment, a resin, an electrolyte and so forth for electrodeposition of the first color. This process is repeated three times, and then finally baking is applied. The electrodeposition technique provides excellent flatness and is effective for color arrangement in a striped pattern, but is difficult to form a color arrangement in a mosaic pattern.

Of the techniques of manufacturing the color filter described above, the printing technique has a drawback in accuracy, and the electrodeposition technique has a drawback in terms of restrictions upon what sorts of images can be patterned. For such reasons, the dyeing technique and the pigment dispersion technique have been most widely used.

However, the dyeing technique and the pigment dispersion technique require a lithography step for forming the pixel regions of each of the first color, second color and third color, and this is a big obstacle to improve the a mass production efficiency of the color filter. One method for forming pixels without a lithography step for each color is an inkjet printing technique of making a color filter. Using an inkjet printing technique to form the pixels, the material efficiency is improved and the processing time becomes shorter, and moreover a color filter having a high brightness can be obtained.

The inkjet printing technique described above will be explained in detail hereinafter.

As shown in FIG. 1A, a black resin layer 20 and a water-repellent layer 22 are sequentially deposited on a substrate 1. The black resin layer 20 serves as a black matrix, and the water-repellent layer 22 is made of fluorine-based material and serves to prevent the printing ink from overflowing in later process. Then, as shown in FIG. 1B, the black resin layer 20 and the water repellent layer 22 are patterned to form a black matrix 24 and a water-repellent film 26, respectively. The water-repellent film 26 serves to isolate each of the colors from each other.

As shown in FIG. 1C, a certain color ink 30 of R (red), G (green) and B (blue) is sprayed individually upon corresponding isolated portions 25 between the water-repellent films 26 using a inkjet unit 28. Such a printing process is repeated three times to form a color filter layer 31 of R, G and B as shown in FIG. 1D. Finally, a passivation film 32 is formed on the whole surface of the substrate 1 while covering the color filter layer 1, whereupon the color filter is completed.

However, for the inkjet-based method of manufacturing the color filter described above, the use of the water-repellent film significantly raises the production cost. Besides, since the water repellent layer (made of the fluorine-based material) is not photosensitive, a photoresist step should be additionally performed during the above patterning process, leading to a long processing time and a low yield.

SUMMARY OF THE INVENTION

An object of the present invention is to provide a color filter fabricated during a short processing time and a method of manufacturing the same.

In order to achieve the above object, the present invention provides a color filter for a liquid crystal display device, which includes: a black matrix formed on a substrate; a photosensitive water-repellent layer correspondingly formed on the black matrix; and a color filter layer formed on said substrate in openings within said water-repellent layer; wherein said water repellent layer has a wet angle greater than 60° with respect to said color filter layer.

The present invention further provides a method of manufacturing a color filter, which includes: forming a metal layer on a substrate; forming a water repellent layer on the metal layer; patterning simultaneously the metal layer and the water repellent layer using a predetermined mask to form a black matrix and a correspondingly-shaped water-repellent layer, the black matrix and the water-repellent layer forming isolated portions at openings within the water-repellent layer; and spraying three colors of ink into corresponding ones, respectively, of said isolated portions to form a color filter layer; wherein said water-repellent layer has a wet angle of greater than 60° with respect to said color filter layer.

The metal layer according to the present invention can have a dual layered structure, e.g., a CrOx layer and a Cr layer. The water-repellent layer can be benzocyclobutene (BCB).

The present invention further provides a method of manufacturing a color filter, which includes: forming a black matrix on a substrate; forming a water-repellent layer on the exposed substrate and the black matrix; irradiating the water-repellent layer from beneath the substrate using the black matrix as a mask; selectively removing irradiated portions of the water-repellent layer; and spraying three ink colors of ink into corresponding openings, respectively, within the black matrixes to form a color filter layer; wherein said water-repellent layer has a wet angle of greater than 60° with respect to said color filter layer.

Such methods according to the present invention can further comprise: removing the water-repellent layer and forming a transparent conductive electrode on the black matrix and the color filter layer. The transparent conductive electrode can be made of indium tin oxide (ITO).

Advantages of the present invention will become more apparent from the detailed description given hereinafter. However, it should be understood that the detailed description and specific examples, white indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

For a more complete understanding of the present invention and the advantages thereof, reference is now made to the following descriptions taken in conjunction with the accompanying drawings, and in which.

DETAILED DESCRIPTION OF PREFERRED EMBODIMENTS

Reference will now be made in detail to the preferred embodiment of the present invention, an example of which is illustrated in the accompanying drawings.

Figure 2A:
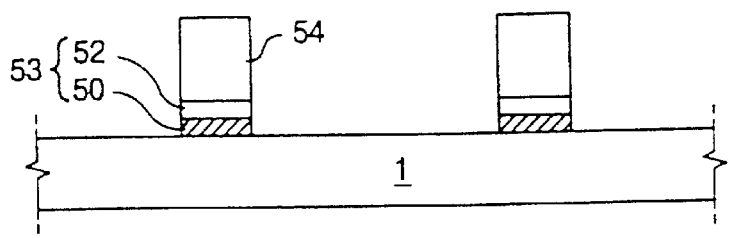
FIGS. 2A to 2C are cross sectional views illustrating a process of manufacturing a color filter according to a preferred embodiment of the present invention.

As shown in FIG. 2A, a black matrix 53 and a water-repellent film 54 are sequentially formed on a substrate 1. The black matrix 53 can have a dual layered structure, e.g., of CrOx layer 50 and Cr layer 52. The black matrix 53 of the dual layered structure is characterized to have a high brightness since it has a low reflectance with respect to the external light. Further, the water-repellent film 54 can be made of a photosensitive benzocyclobutene (BCB). The BCB is superior in flatness and therefore widely used as a passivation layer. The black matrix 53 and the water-repellent film 54 can be simultaneously patterned from above (in contrast to being patterned from underneath, see the discussion of FIG. 3 below) due to the photosensitive BCB. This is because the photosensitive BCB further acts as a photoresist.

In the process shown in FIG. 2A, since an overhang may occur during an etching process, the black matrix 53 and the water-repellent film 54 are also formed using a self-aligning technique.

Figure 3:
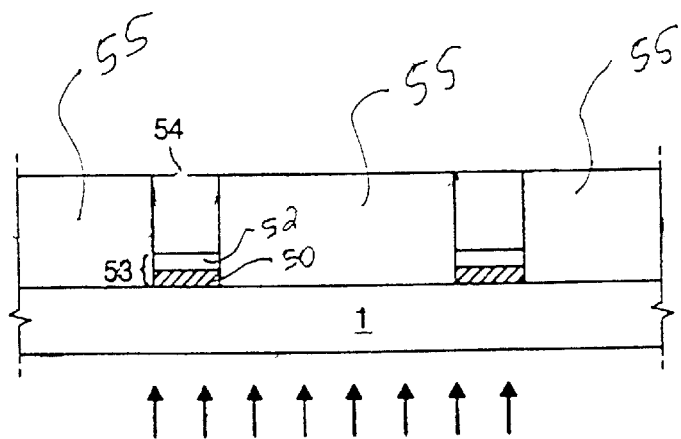
FIG. 3 is a cross sectional view illustrating a process of manufacturing a color filter using a self-aligning technique according to the preferred embodiment of the present invention.

FIG. 3 shows another process of forming the black matrix 53 and the water-repellent film 54 using the self-aligning technique. As shown in FIG. 3, the CrOx layer 50 and the Cr layer 52 are sequentially deposited and patterned into the black matrix 53. Then, the photosensitive BCB layer is deposited on the whole surface of the substrate 1 while covering the black matrix 53. Light is irradiated from a bottom portion toward the photosensitive BCB using the black matrix 53 as a mask, thereby patterning the BCB layer that results in the water-repellent film 54 and portions 55 of the irradiated BCB layer that will be removed.

Figure 1A:
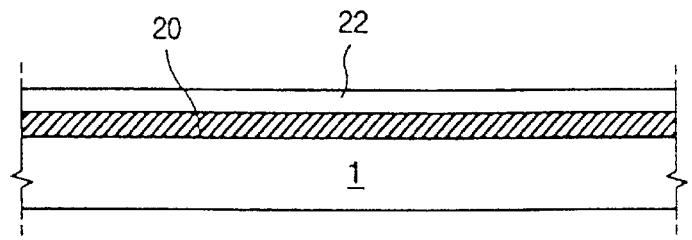
FIGS. 1A to 1D are cross sectional view illustrating a process of manufacturing a color filter using an inkjet printing technique according to the related art.
Figure 1B:
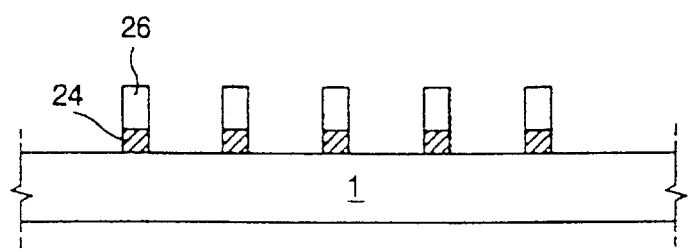
Figure 1C:
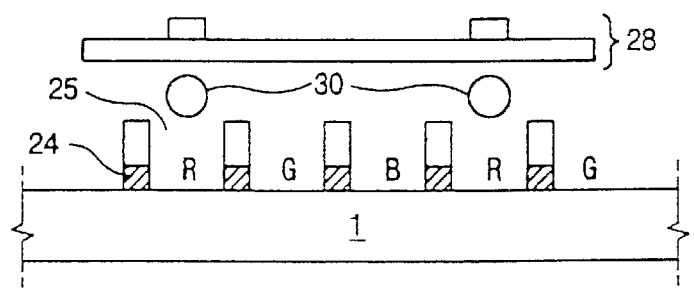
Figure 1D:
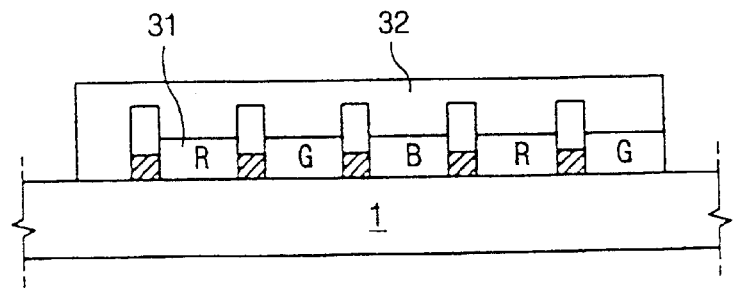
Figure 2B:
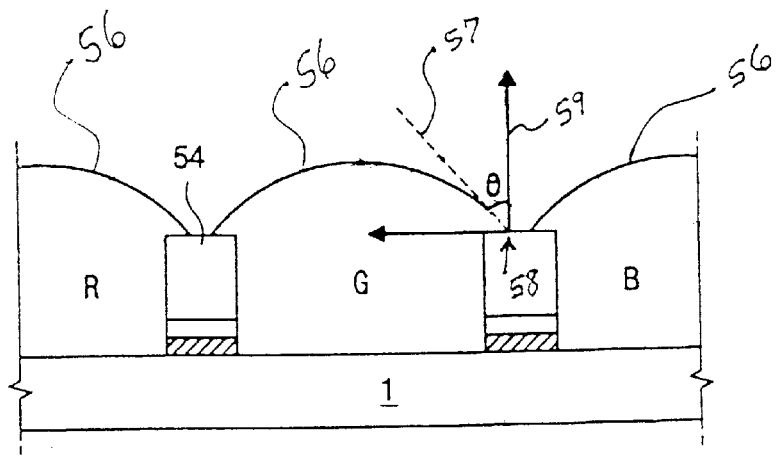

Sequentially, as shown in FIG. 2B, a certain color ink of R (red), G (green) and B (blue) is sprayed on corresponding portions between the water-repellent films 54 using an inkjet unit (not shown). Such a printing process is repeated three times to form a color filter layer 31 of R, G and B as shown in FIG. 1C.

It is preferred that the water-repellent film 54 have a wet angle θ of more than 60° so as to have a high hydrophobicity. The BCB has a wet angle more than 60° and therefore it is suitable for the water-repellent film 54. The forces of cohesion within the R, G, and B inks are greater than the forces of attraction of the inks to the BCB layer 54. This produces an antiwetting of the BCB layer 54 by the inks. As a result, FIG. 2B depicts each of the ink volumes R, G and B as having a convex meniscus 56. And so a wet angle θ is defined between a tangent line 57 to the meniscus 56 where it meets the water-repellent film 54 (at a point 58) and a normal direction 59 to the water-repellent film 54. In other words, it is preferred that the water-rerney repellent film 54 have a wet angle of more than 60° to inhibit the printing inks of a color filter layer from overflowing the adjacent color filter layer such that a color spot of the color filter is prevented.

Figure 2C:
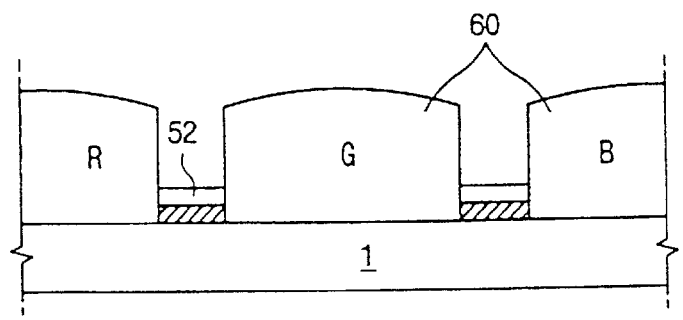

Further, the BCB layer 54, as shown in FIG. 2C, may be removed to enhance an adhesion between the Cr layer 52 of the black matrix 53 and a common electrode can be an indium tin oxide (ITO) layer that will be formed in a later process when the color filter is formed on a thin film transistor array substrate of a liquid crystal display device.

Figure 4:
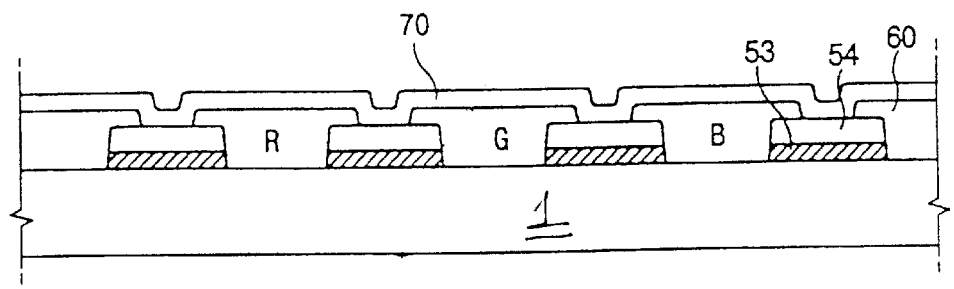
FIG. 4 is a cross sectional view illustrating a color filter according to the preferred embodiment of the present invention.

Finally, as shown in FIG. 4, a common electrode 70 of ITO is formed on the whole surface of the substrate 1 while covering the color filter layer, whereupon the color filter is completed.

At this time, a thickness of the color filter layer 60 depends on that of the BCB layer 54. In other words, by adjusting a thickness of the water-repellent layer 54 of the BCB, a chromaticity of the color filter can be adjusted.

As described hereinbefore, using a method of manufacturing a color filter according to the preferred embodiment of the present invention has at least the following advantages. First, since a photoresist step is omitted, the processing time can be reduced. Second, because low-cost BCB can be used instead of high-cost fluorine-based material as the water-repellent layer, the production cost can be reduced. Third, since a thickness of the color filter depends on the BCB layer, a chromaticity of the color filter can be adjusted.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A color filter for a liquid crystal display device, the color filter comprising:
    a black matrix formed on a substrate;
    a photosensitive water-repellent layer correspondingly formed on the black matrix, wherein the photosensitive water repellent layer is made of benzocyclobutene (BCB); and
    a color filter layer formed on said substrate in openings within said water-repellent layer.

2. A method of manufacturing a color filter, the method comprising:
    forming a metal layer on a substrate;
    forming a photosensitive water-repellent layer on the metal layer, wherein the photosensitive water-repellent layer is made of benzocyclobutene (BCB);
    patterning simultaneously the metal layer and the photosensitive water-repellent layer using a predetermined mask to form a black matrix and a correspondingly-shaped water-repellent layer, the black matrix and the photosensitive water-repellent layer forming isolated portions at openings within the photosensitive water-repellent layer; and
    spraying three colors of ink on corresponding ones of said isolated portions, respectively, to form a color filter layer.

3. The method of claim 2, further comprising, removing the BCB layer.

4. The method of claim 3, further comprising, forming a transparent conductive electrode on the black matrix and the color filter layer.

5. The method of claim 4, wherein the transparent conductive electrode is made of indium tin oxide (ITO).

6. A method of manufacturing a color filter, the method comprising:
    forming a black matrix on a substrate;
    forming a photosensitive water-repellent layer on the exposed substrate and the black matrix, wherein the photosensitive water-repellent layer is made of benzocyclobutene (BCB);
    irradiating the photosensitive water-repellent layer from beneath the substrate using the black matrix as a mask;
    selectively removing irradiated portions of the photosensitive water-repellent layer; and
    spraying three colors of ink into corresponding openings, respectively, within the black matrix to form a color filter layer.

7. The method of claim 6, further comprising, removing the benzocyclobutene layer.

8. The method of claim 7, further comprising forming a transparent conductive electrode on the black matrix and the color filter layer.

9. The method of claim 8, wherein the transparent conductive electrode is made of indium tin oxide (ITO).

* * * * *